June 26, 1962   H. C. GOTTI   3,040,990
WASHER ATTACHMENT FOR ROTARY LAWN MOWERS
Filed Aug. 23, 1960

INVENTOR.
HOWARD C. GOTTI
BY
W.B.Harpman
ATTORNEY

United States Patent Office 3,040,990
Patented June 26, 1962

3,040,990
WASHER ATTACHMENT FOR ROTARY
LAWN MOWERS
Howard C. Gotti, 3594 Wyandot Lane,
Youngstown 2, Ohio
Filed Aug. 23, 1960, Ser. No. 51,403
4 Claims. (Cl. 239—273)

This invention relates to a washer attachment for rotary lawn mowers and more particularly to a device that may be quickly and easily positioned on the housing of a rotary lawn mower and will be self-retaining thereon.

The principal object of the invention is the provision of a washer attachment arranged to clamp on the housing of a rotary lawn mower so that a water supply from a source such as a garden hose may be connected thereto and the water therefrom directed within the housing of the lawn mower.

A further object of the invention is the provision of a washer attachment for a lawn mower that is resilient and shaped to be self-retaining when positioned over the edge of the housing of a rotary lawn mower.

A still further object of the invention is the provision of a washer attachment for a rotary lawn mower that may be molded of resilient plastic material and attached to the lawn mower by frictional engagement therewith.

The washer attachment for rotary lawn mowers disclosed herein comprises a simple, inexpensive device preferably formed of molded plastic material that may be easily positioned on the downturned flange of the housing of a rotary lawn mower where it will be self-retaining and provide water jets on the interior of the housing and a means of connecting a garden hose on the exterior.

It has been determined that the grass clippings which normally collect within the housing of a rotary lawn mower can be completely removed through the introduction of one or more streams of water into the housing while the rotary blade of the lawn mower is moving. The action of the blade directs the water to all parts of the housing and washes it thoroughly in a very short time.

The device of the present invention provides means for directing water into the housing at the proper location and the device can be quickly and easily installed on the lawn mower or removed therefrom without cutting, drilling or otherwise altering the rotary lawn mower or any part thereof.

With the foregoing and other objects in view which will appear as the description proceeds, the invention resides in the combination and arrangement of parts and in the details of construction hereinafter described and claimed it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
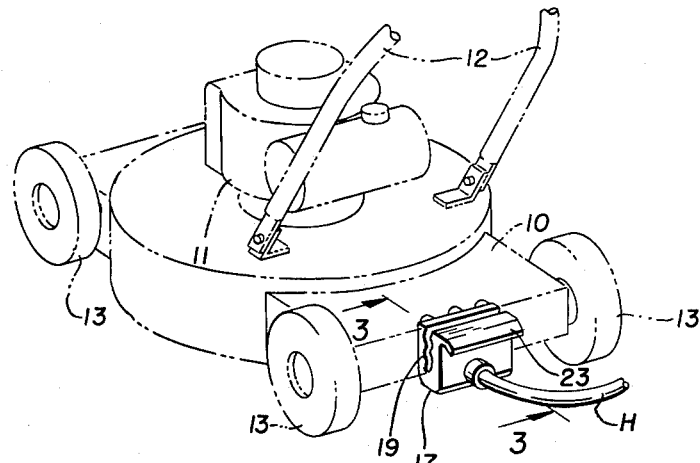
FIGURE 1 is a perspective view of a rotary lawn mower with the washer attachment in position thereon.
Figure 4:
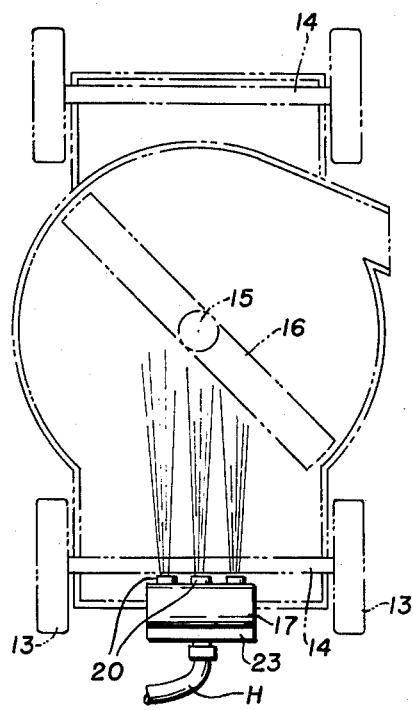
FIGURE 4 is a bottom view of a rotary lawn mower showing the washer attachment in position thereon.

By referring to the drawings and FIGURES 1 and 4 in particular, it will be seen that a lawn mower of the rotary type is disclosed that includes a flanged housing 10 which has a motor 11 mounted thereon and a handle 12 movably attached thereto. Ground engaging wheels 13, 13 are rotatably mounted on axles 14, 14 and the motor 11 drives a crankshaft 15, the lowermost end of which mounts a blade 16.

A washer attachment comprising a body member 17 U-shaped when viewed in end view, is preferably formed of resilient molded plastic material to define a U-shaped cavity 18 in the body member 17. The area between the arms of the U-shaped body member 17 defines an undulating shaped slot 19 extending downwardly in the body member 17 from the top thereof. A plurality of nozzles 20, 20 on one side of the body member 17 communicate with the U-shaped cavity 18 on one side of the slot 19 and are directed outwardly from the U-shaped body member 17. A tubular extension 21 on the opposite side of the body member 17 communicates with the opposite side of the U-shaped cavity 18 and mounts a rotatable collar 22 which is adapted to threadably engage and secure the end of a garden hose such as seen in FIGURES 1 and 4 and indicated by the letter H.

Figure 2:
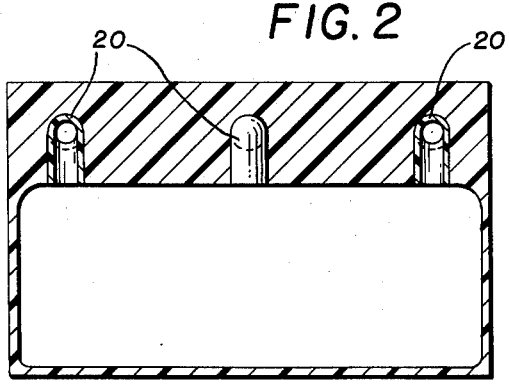
FIGURE 2 is an enlarged vertical section of the washer attachment.
Figure 3:
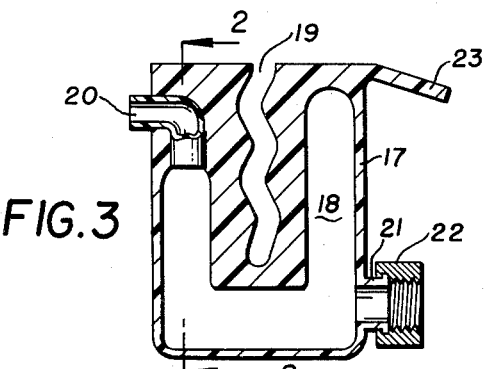
FIGURE 3 is an enlarged cross section on line 3—3 of FIGURE 1. Cross section lines 2—2 in FIGURE 3 indicate the cross section of FIGURE 2.

As illustrated in FIGURES 2 and 3 of the drawings, the nozzles 20 are L-shaped tubular members positioned in the body member 17 and establish communication with the U-shaped cavity 18 therein and extend sidewardly exteriorly of the U-shaped body member 17. It will occur to those skilled in the art that the nozzles 20 may be integrally formed with the body member 17 if desired. The U-shaped body member 17 has a projecting flange 23 along the outer upper edge thereof above the tubular extension 21 to form a convenient hand grip by which the device may be easily held and installed by moving the same upwardly over the flange housing 10 as shown in FIGURES 1 and 4 so that the flange of the housing 10 enters the undulating slot 19 and is frictionally engaged therein by the body member 17.

It will thus be seen that the washer attachment for rotary lawn mowers as disclosed herein comprises the body member 17 which is so arranged that it may be easily positioned on the flanged housing of a rotary mower and will be self-retaining thereon by reason of the clamping effect of the U-shaped body member 17 of the device co-operating with the undulating shaped grooves 19 therein which defines the U-shape thereof. It will be seen that the shape of the groove 19 undulates on a vertical plane and that in effect the surfaces thereof are alternate ridges and valleys. It will thus be seen that a washer attachment for rotary lawn mowers has been disclosed which meets the several objects of the invention, and having thus described my invention, what I claim is:

1. A washer attachment for a rotary lawn mower having a depending flange about the rotary blade therein, said washer attachment comprising a body member having a narrow transversely extending groove therein, said body member having a hollow interior comprising a fluid chamber, a plurality of nozzles on one side of said body member communicating with said fluid chamber and an inlet opening on the other side of said body member communicating with said fluid chamber and wherein said fluid chamber is U-shaped in cross section with said narrow groove positioned between the arms of the U-shaped fluid chamber in spaced relation thereto.

2. A washer attachment for a rotary lawn mower set forth in claim 1 and wherein a longitudinally extending sidewardly projecting flange is formed on the side of said body member in which said inlet opening is formed, and wherein transversely extending ribs are formed on the sides of said narrow groove.

3. A washer attachment for a rotary lawn mower comprising a hollow body member of general U shape, the opposed surfaces thereof being undulating in shape, said body member formed of resilient material, at least one nozzle on one side of said body member communicating with the hollow interior thereof and an inlet opening on the opposite side thereof fitting on said body member about said inlet opening for receiving and joining a garden hose thereto.

4. The washer attachment for a rotary lawn mower set forth in claim 3 and wherein a sidewardly projecting longitudinally extending flange is formed on one side of said body member above said inlet opening.

References Cited in the file of this patent

UNITED STATES PATENTS

| | | |
|---|---|---|
| 1,628,458 | French | May 10, 1927 |
| 2,331,421 | Redhead | Oct. 12, 1943 |
| 2,605,136 | Kline et al. | July 29, 1952 |
| 2,665,171 | Stievater | Jan. 5, 1954 |
| 2,775,773 | Marsh | Jan. 1, 1957 |
| 2,869,812 | Hamel | Jan. 20, 1959 |
| 2,920,855 | Giebel | Jan. 12, 1960 |
| 2,936,563 | Blume | May 17, 1960 |
| 2,984,061 | Stabnau | May 16, 1961 |